United States Patent [19]

Guttman et al.

[11] Patent Number: 5,354,069
[45] Date of Patent: Oct. 11, 1994

[54] LOTTERY EMULATION SYSTEM

[75] Inventors: Uri Guttman, Arlington; Avi N. Nelson, North Reading; Robert A. Piankian, Brighton; Joseph Scally, Westwood, all of Mass.

[73] Assignee: Ahbrew Company, New York, N.Y.

[21] Appl. No.: 823,185

[22] Filed: Jan. 21, 1992

[51] Int. Cl.$^5$ .............................................. A63F 9/22
[52] U.S. Cl. ................... 273/439; 273/138 A; 273/269; 364/412
[58] Field of Search ............... 273/138 R, 138 A, 139, 273/269, 439; 364/410, 412; 379/88, 89, 90, 91, 93, 95

[56] References Cited

U.S. PATENT DOCUMENTS

| | | | |
|---|---|---|---|
| 3,920,908 | 11/1975 | Kraus | 179/2 |
| 4,494,197 | 1/1985 | Troy et al. | 364/412 |
| 4,649,563 | 3/1987 | Riskin | 379/97 |
| 4,697,282 | 9/1987 | Winter et al. | 379/67 |
| 4,782,509 | 11/1988 | Shepard | 379/88 |
| 4,815,741 | 3/1989 | Small | 273/138 A |
| 4,845,739 | 7/1989 | Katz | 379/92 |
| 4,922,522 | 5/1990 | Scanlon | 379/95 |
| 4,937,853 | 6/1990 | Brule et al. | 364/412 |
| 4,959,783 | 8/1990 | Scott et al. | 364/412 |
| 4,969,183 | 11/1990 | Reese | 379/88 |
| 4,982,337 | 1/1991 | Burr et al. | 364/412 |
| 4,996,705 | 2/1991 | Entenmann et al. | 379/91 |
| 5,035,422 | 7/1991 | Berman | 273/439 |
| 5,083,272 | 1/1992 | Walker et al. | 364/412 |
| 5,218,631 | 6/1993 | Katz | 379/88 |

*Primary Examiner*—Jessica J. Harrison
*Attorney, Agent, or Firm*—Lahive & Cockfield

[57] ABSTRACT

A lottery by phone system which permits a caller to place bets with a state's existing lottery computer system via a telephone call from a touch-tone telephone which is connected via the public telephone network to a voice response unit which decodes touch-tones entered by the caller. The voice response unit prompts the caller with preprogrammed digitized audio messages and has each caller identified via a unique identification number. It permits such a caller to select which game to place a bet with and to have the option of picking their own numbers or having the system randomly pick numbers for them. It allows the caller to collect their winnings using a touch tone telephone via another telephone call, and to have the automatic interaction with the caller handle data entry errors, and to have caller queries regarding previous such bets answered by an operator. The system communicates with the existing state lottery computer via emulation of the existing communications protocol used between the existing state lottery computer and on-line terminals and performs automatic high level error recovery beyond the specifications of that communications protocol.

12 Claims, 11 Drawing Sheets

1

LOTTERY EMULATION SYSTEM

BACKGROUND OF THE INVENTION

The invention relates generally to lotteries and particularly to the emulation of an on-line lottery system by telephone.

Many individual states (or groups of states) have a lottery authority which provides to the public a wagering system (typically known as a state lottery) whereby a person can wager a sum of money on a game in a drawing pool along with thousands of other players with cash prizes to the players who have won according to the rules of the particular game played. There are two major styles of games played, the first typically called "instant" or "scratch" games. Instant or scratch games are those where a player is sold a card by a registered agent of the lottery, which card typically has sections covered with opaque ink which are scratched or rubbed off revealing if the card is a winner and how big a prize, if any, was won. The other style of game is typically called "on-line" and involves special computer terminals which communicate directly with a central computer at the lottery headquarters and offer games with a drawing of winning numbers at known dates and times for each game. This invention concerns itself with the on-line games.

A player who wishes to place a bet with a state's on-line game must first go to a public place where an on-line terminal is located and operated by an agent licensed by the lottery authority. The player decides on which game to play, what type of bet and how much to wager. The bet is then entered into the lottery on-line terminal by the agent using one of two common methods, the keyboard or an optical card reader. The keyboard method requires the agent to enter all the bet information using the on-line terminal's keyboard. The optical card reader method requires the player to mark boxes on a game-specific card with the bet information which is handed to the agent who then inserts it into an optical reader in the on-line terminal. After either method of data entry the agent has the on-line terminal transmit the bet to the central computer of the lottery authority. If the player wishes to, the on-line terminal can randomly select the actual numbers for the bet (typically called a "quick-pick"), but the player must still provide the game, amount wagered and other game-specific information. In all cases a betting ticket is printed by the on-line terminal with the game played, its drawing date, the date and time of the bet, the numbers played, the combination bets played, the wagered amount (possibly of each combination bet), the total amount owed the agent, and a unique transaction number generated by the lottery computer. The agent collects the total amount from the player and gives them the betting ticket. Also, printed on the ticket is usually a bar code which can be read by an optical reader in the on-line terminal used to cash winning tickets. The printed ticket is the only record the player has of the bet so it must be printed accurately. If it does not get printed the agent must take corrective action.

All lottery games have a specified fixed price per unit bet (typically $0.25 or $1.00) with the option of the player purchasing multiple bet units on a single bet ticket. The lottery system also has a maximum bet amount on a single bet ticket, but a player can purchase multiple bet tickets if so desired. Each bet unit purchased for a game which wins is entitled to an equal share of the prize pool allocated for that type of win.

There are many different games provided by state lotteries and they generally fall into two major categories, each with many variations, typically called "numbers" type games and "lotto" type games.

Numbers type games typically require the player to select a sequence of (typically 3 or 4) numbers from 0 to 9 (although some games use 1 to 13 with a playing card motif). The game has a drawing of (typically 3 or 4) numbers at a regular date and time and the players can collect prizes if their numbers match the drawn numbers according to the type of bet. There are many varieties of bets allowed including matching subsets of the drawn numbers and allowing "any" or "exact" order of the digits. A player can typically purchase a combination of bet types for a single set of selected numbers with varying numbers of bet units purchased for each bet type. For example, a player can pick 1822 and decide that the 4 digits must match in exact order, the first three can match in any order and the last 2 must match in exact order. If the state's picks for that drawing are 8122, the player wins the first three any order bet, the last two exact order bet and loses the all four exact order bet. The cash prize amount for a type of bet depends on the odds of a match for that type of bet and the total pool of money wagered on that type of bet. The odds for a 4 number (each number is from 0 through 9) bet in exact order is 1 in 10,000 with a typical payout of 5,000 bet units per unit bet.

Lotto type games typically require the player to select a unique subset of a range of numbers such as 5 unique numbers from 1 to 35. The drawing consists of the state picking 5 unique numbers and a player wins if their picks match a subset of drawn picks. For example, if the state draws the numbers 3, 9, 14, 24, and 32 and the player picks 5, 9, 13, 24 and 32, the bet matches 3 out of the 5 drawn numbers and the player wins the prize for matching 3 out of 5. The odds of getting 5 out of 5 matches are very high (in this case 1 out of 324,632), so the prize is usually very large, with some games adding to the jackpot pool the jackpot pool of the previous drawing that had no jackpot winners, typically called "rolling over the jackpot," until there is a winner who wins the entire accumulated jackpot.

For each game, at some predetermined date and time, the state lottery conducts a drawing of the winning numbers. This is typically done via mechanical means (such as numbered balls selected from a rotating cage). In all states the results of the drawing are made public with many local media outlets reporting the winning numbers and the prize amounts.

If a player believes that his or her lottery ticket is a winning ticket, he or she takes the ticket to an on-line lottery agent and asks that it be processed. Typically, the ticket is read by an optical reader or its transaction identification number can be entered manually on the keyboard and then the information is transmitted to the lottery computer. If the bet ticket is not a winner the on-line terminal displays an appropriate message and the agent tells the player that the bet did not win. If the ticket is a winning ticket, then the on-line terminal will print out a cash or claim ticket depending on the size of the cash prize. If it is a small cash prize (typically under $600) then the lottery agent pays the holder of the bet ticket the amount printed on the cash ticket. The winning bet ticket and the cash ticket are kept by the agent and are sent to the lottery at a later date. If it is a large cash prize (typically $600 or greater) a claim ticket is printed and the agent fills out a claim form and at a later date sends that with the winning bet ticket and the claim ticket to the state lottery, which will then send the cash prize to the player. The printed cash or claim ticket is the only record the agent has of the transaction, so it must be printed accurately. If it does not get printed the agent must take corrective action. If the prize for the winning ticket is a free play, the player is allowed to immediately make another play of the same game as the winning play without paying the agent for the play.

Lottery on-line terminals are programmed to execute a wide range of transactions on behalf of the agent. The transactions fall into several categories. Bet transactions cover all the various bets for all the games supported by the lottery. Cash transactions include cashing a winning bet ticket and inquiring the status of a bet ticket. Accounting transactions return to the agent the sales figures for various time periods. Diagnostic transactions test the printer, communications, keyboard, display, etc. of the on-line terminal. Message transactions print out messages directed to all agents or just one agent. Error recovery transactions include finding out the last transaction (bet, cash or cancel) that the lottery accepted and cancelling previous bet transactions.

The licensed agent operates the lottery on-line terminal for the player and decides which transactions to perform on the on-line terminal and in which order to perform them. The agent can only perform one transaction at a time which must go to completion or be aborted before another transaction can be started. To simplify the operation, the most common transactions of placing bets and cashing winning bets can have their data read by optical readers from the mark-sense betting cards and the bar codes printed on the bet tickets. In case a card or ticket cannot be read the agent can manually enter the information on the keyboard and perform the transaction. There are also many other transactions that can only be performed manually by the agent. These include signing on at the beginning of the day, canceling bets, obtaining sales and accounting information, obtaining the winning plays and the prize amounts, etc. The agent also has to handle the exceptional conditions which include aborted transactions, no ticket being printed, and requesting agent-specific messages from the lottery computer. If there is a major failure in the on-line terminal or the lottery system, the player does not pay for the play unless a bet ticket is printed. If no ticket was printed the agent will verify whether the play was accepted by the lottery computer and, if so, cancel that play. The agent may also run diagnostic transactions and decide that the on-line terminal may need maintenance or repairs.

The agent is trained to handle the exceptional conditions by using standard procedures which specify which transactions to execute in order to keep the on-line terminal operating properly. In the event of a ticket not printing (for either a bet or a cash transaction), the agent performs a "get last transaction" transaction. This will print on a "not for sale" ticket the information describing the last transaction accepted by the lottery computer for this on-line terminal. The agent compares that information with the information entered but for which no ticket was printed. If the information matches, then the lottery accepted the transaction and since there was no ticket, the agent cancels that transaction using the transaction identification number printed on the last transaction slip. The agent then reenters (or uses the optical reader to reenter) the originally requested transaction and should get a proper ticket printed. The operation of the on-line terminal then proceeds normally. Another case occurs when the lottery computer sends a message to a specific agent. The on-line terminal, when it gets a command that a message is waiting to be read, will not accept any other transactions but a "get specific message" transaction. The agent performs the "get specific message" transaction, the message is printed on the ticket and operation of the on-line terminal proceeds normally.

State lottery computer systems, in order to lower communication costs, use dedicated leased telephone lines which are multidropped to a group of lottery on-line terminals (typically a maximum of about 30). A multidropped line means that a group of on-line terminals share a single communications port on the lottery computer. The lottery computer controls and communicates with the on-line terminals using a polled half-duplex protocol. The protocol works by giving each on-line terminal on a multidropped line a unique number which the lottery computer uses to address the individual on-line terminals. The lottery computer asks (polls) each on-line terminal in sequence if it has a transaction to execute. All the lottery on-line terminals listen to this poll but only the addressed on-line terminal responds, hence the half duplex nature of the protocol, whereby data is transmitted on the communication line in only one direction at a time. If the on-line terminal has no transaction pending it sends an idle response back to the computer. If it has a pending transaction, it sends it. When the transaction is completed, the computer polls the next on-line terminal. The protocol defines the various formats of the data transmitted, the handshaking between the computer and the on-line terminal and an error detection and recovery mechanism. In the event of detected errors in transmission, the protocol specifies how to retransmit the messages. If the transaction has too many detected errors or the protocol cannot recover from an exceptional condition, an abort occurs, which resets the handshake to the idle state and requires the agent to manually assess the situation and to optionally retry the transaction. The protocol does not define how to recover from aborted transactions or exceptional conditions. It only defines the individual transactions used by an agent to recover and the agent must decide in what sequence to perform those transactions.

Lottery players who wish to play an on-line game must go to a public location with a lottery on-line terminal during business hours, possibly wait in a line if the store is busy or many people are playing the lottery, and have cash on hand to pay the agent for the bet. These restrictions make it hard for people to bet if there is no nearby location with a lottery on-line terminal, if they cannot arrive there before the current drawing is closed, if they have no cash on hand, if the location is closed or if they wish to play during the time (typically overnight) that the lottery computer is scheduled to be shut down or if they wish to play a game at a time when the lottery on-line terminal is available for other games but the game they wish to play is "closed." There are also players who like to bet so-called "hunches" when they have one without having to travel to a lottery agent.

State lotteries are interested in increasing the volume of bets made and not increasing their expenses in handling these additional bets. A way to solve the restrictions listed above is to allow bets by touch-tone telephone.

It is an object of the invention to implement a lottery by telephone service which communicates to the lottery central computer by using the communication lines and protocol of the standard lottery on-line terminals.

It is another object of this invention to provide a lottery by telephone service to a state's existing lottery system via emulation of the existing communications protocol between the on-line terminals and the lottery computer, without any additional hardware or software design or changes on the part of the lottery.

It is also an object of this invention to execute a subset of the lottery on-line terminal's transactions, and to emulate the lottery on-line terminal's communications protocol so that it can provide to callers the ability to place bets and cash winning bets, and to execute those transactions necessary to recover from exceptional conditions. The invention also automatically executes the sequence of transactions needed to recover that the lottery agent would perform manually.

It is an object of this invention to provide callers 24 hour a day availability to place bets with the lottery even though the lottery may only provide limited hours of operation, by accepting off-hours bets, storing them and transmitting them to the lottery at the next period of normal lottery operations.

It is an object of the invention to provide telephone access to callers so they can find out if and what they have won from the lottery, and to allow any free plays won to be made immediately, and for cash prize winners to have their winnings or claim forms mailed to them.

It is an object of the invention to provide telephone access to callers so that they can make inquiries regarding their previous plays, status of pending claims or cash prizes and have these questions answered automatically or by customer service personnel.

SUMMARY OF THE INVENTION

The system of the invention, for playing a lottery by telephone, is for use with a lottery computer that accepts digital input in proper form from remote terminals as bet transactions, that records bet transactions that have been completed, and that provides digital output confirming that a bet transaction has been completed. The system includes response means for interacting with a telephone bettor, coupled to the lottery computer, including instruction means for giving preselected messages in response to first selected telephone signals, input means for transferring data to the lottery computer as a bet transaction in response to second selected telephone signals, confirmation means for confirming to a telephone bettor that a bet transaction has been completed by the lottery computer, the confirmation means including error detection and correction means for deleting and correcting aborted bet transactions while a telephone bettor is on the line.

Preferably, the error detection and correction means includes detection means for detecting when output confirming completion of a bet transaction has been received from the lottery computer, and correction means for resending a bet transaction that was not confirmed as accepted by the lottery computer. Also, the detection means includes last-bet-means for determining the last bet accepted by the lottery computer, and the correction means includes comparison means for comparing said last bet accepted by the lottery computer to the last bet for which confirmation of completion was detected, and resend means for resending said last bet transaction that was not confirmed as accepted, if the comparison is positive, and not resending said last bet transaction if the comparison is negative. Furthermore, the error detection and correction means may include acknowledgment means for acknowledging the bet transaction if the comparison is negative.

In preferred embodiments, the system includes data storage means for receiving bet transaction data from the response input means, coupled to the response means and the lottery computer, the data storage means including data input means for storing bet transaction data transmitted from the response input means, data output means for transmitting bet transaction data to the lottery computer, availability detection means for detecting when the lottery computer is unavailable to accept bet transaction data, and spooling means for storing bet transaction data when the lottery computer is unavailable. Also, the availability detection means may include means for detecting when the lottery computer is available to accept bet transaction data, and the spooling means includes means for transmitting bet transaction data that was stored when the lottery computer was unavailable.

Also, in systems where the lottery computer further includes means for storing and transmitting winning bet data, the invention further includes data storage means for receiving winning bet data from the lottery computer, coupled to the response means and the lottery computer, the data storage means including data input means for storing bet transaction data transmitted from the response means, winning bet input means for storing winning bet data transmitted by the lottery computer, culling means for comparing winning bet data stored in the data storage means to bet transaction data stored in the data storage means, and winning bet marking means for marking all winning bet transactions in the data input means. Also, the response means instruction means includes authorization means for authorizing free plays to bettors in response to third selected telephone signals.

BRIEF DESCRIPTION OF THE DRAWINGS

Other objects, features and advantages of the invention will be described below, or be apparent from the following description of a preferred embodiment of the invention, including the drawings, in which.

DESCRIPTION OF THE PREFERRED EMBODIMENT

Figure 1:
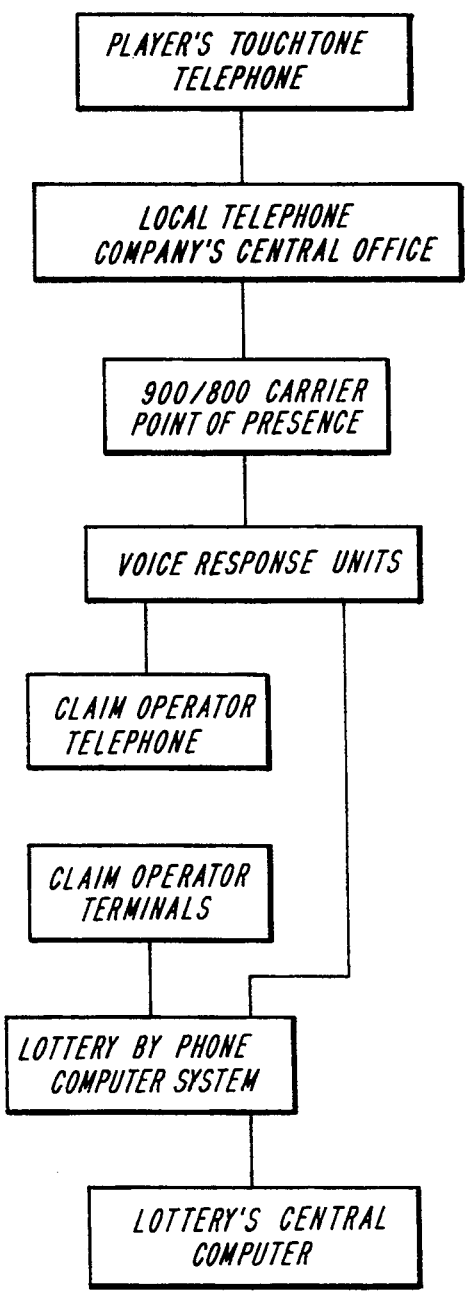
FIG. 1 is a block diagram of the system of the invention network showing the major subsystems from the caller's telephone to the lottery's computer and the communications links between them.

FIG. 1 illustrates the data communication path from the caller's telephone to the lottery's central computer. The caller's telephone, which is connected to the local telephone company's central office, makes a call to the 800/900 or other number. The central office routes that call to the particular long distance carrier's network which then routes the call to the bank of voice response units (VRU). A VRU answers the call and sends the caller-entered touch-tone data to the LBP computer system. The LBP computer sends commands back to the VRU which then speaks appropriate audio messages to the caller. If the call is one that has to be handled by an operator (such as a caller claiming a winning bet with a cash prize), the LBP computer commands the VRU to connect it to an operator who converses with the caller and enters and retrieves caller-specific data via an on-line terminal connected to the LBP computer. Finally, the LBP computer sends bet, cash and other transactions to the lottery computer system which sends back appropriate responses.

Figure 2A:
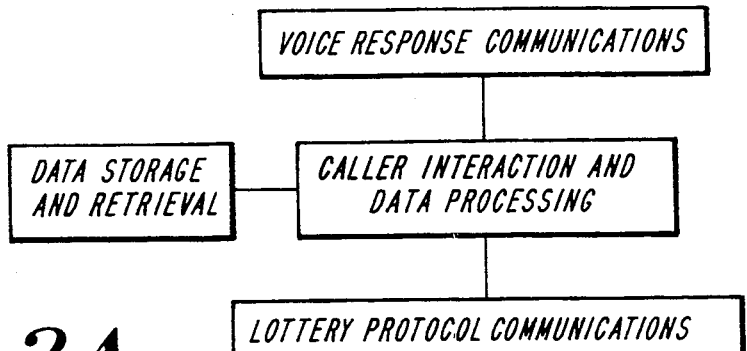
FIGS. 2a-f are a set of block diagrams and flow charts illustrating the logical design of the system.

FIG. 2a illustrates the major logic blocks in the design of the LBP system. The Voice Response Communications block controls the bank of VRU's and switches incoming calls to the appropriate application. The VRU typically has its own command and response protocol and this block generates commands for the VRU's and parses responses from the VRU's. These commands typically include answering the call (off-hook), speaking stored digitized audio messages to the caller, switching the call to another telephone line (typically to a operator telephone), and terminating the call (hangup). The responses from the VRU's typically include incoming calls (ring), touchtone data entered by the caller, timeouts which indicate a caller has not entered touchtone data during a given time period, and call termination by the caller (hangup). Switching of incoming calls is performed by one of two possible methods. Individual incoming telephone lines may be dedicated to a particular application and any calls coming in on such a line is automatically switched to its associated application. The other method uses the Dialed Number Identification Service (DNIS) which is a set of touchtone digits generated by the long distance telephone carrier. The digits uniquely identify which telephone number was dialed by the caller and this block then switches the call to the application associated with the DNIS value. The Data Storage and Retrieval block supports the LBP system by storing data records so that it can be retrieved efficiently. This can be accomplished by a custom sub-system or a commercial data management system such as offered by Sybase, Inc., Informix, Inc., etc. The Caller Interaction and Data processing block is described in detail in FIGS. 2b-2e. The Lottery protocol communications is described in detail in FIG. 2f.

Figure 2B:
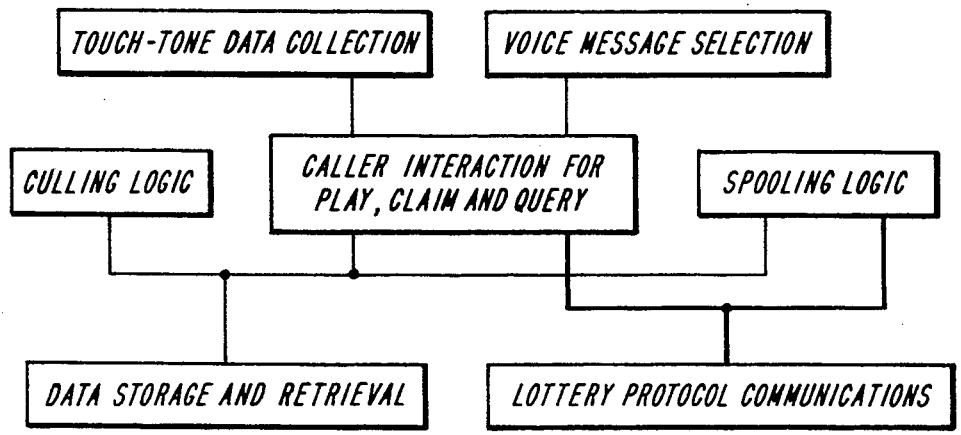

FIG. 2b illustrates the major logic blocks which perform the Call Interaction and Data processing. The caller interaction logic selects and generates an audio message which prompts the caller to enter touch-tone data. The entered touch-tone data is collected and passed to the caller interaction logic which further processes it as described in FIG. 2c. The spooling logic block sends plays to the lottery computer which were stored when the lottery computer was scheduled to be down. The culling of the winning plays from all plays in a single lottery game is controlled by the Culling logic described in FIG. 2e.

Figure 2C:
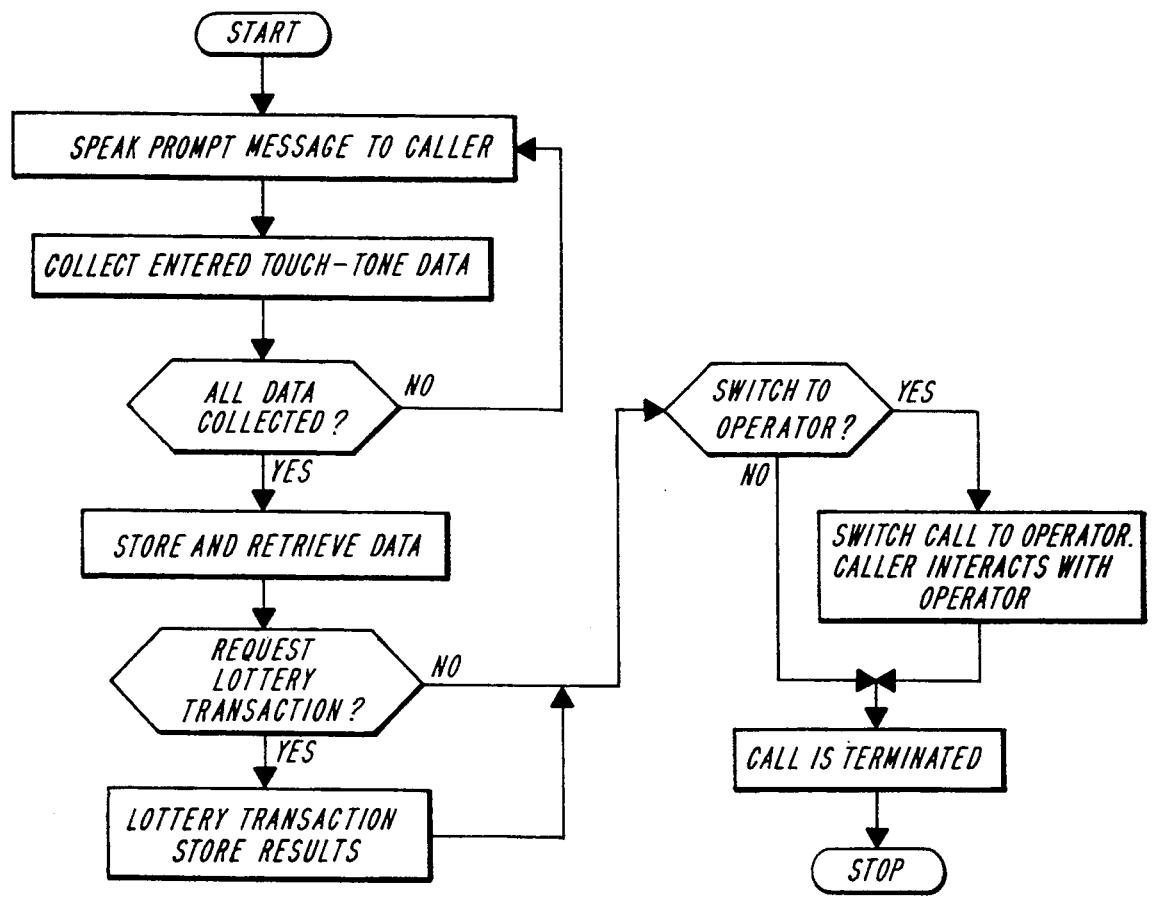

FIG. 2c illustrates the logic flow chart of the interaction with callers. When a call starts and is switched to an application by the Voice Response Communication block an audio message is selected and spoken to the caller. The caller is expected to enter touch-tone digits which are collected and stored. If more data is required, the caller is prompted with another audio message for more touch-tone data. When all the required data is collected, it is stored and data specific to the application is retrieved. The application processes the retrieved data and may generate a request to the lottery computer system, typically placing a play or cashing a winning play. The application may also decide to connect the caller to an operator, typically to process a winning play the caller is claiming or to answer question that the caller has. The call then is terminated and another call may start on that incoming telephone line.

Figure 2D:
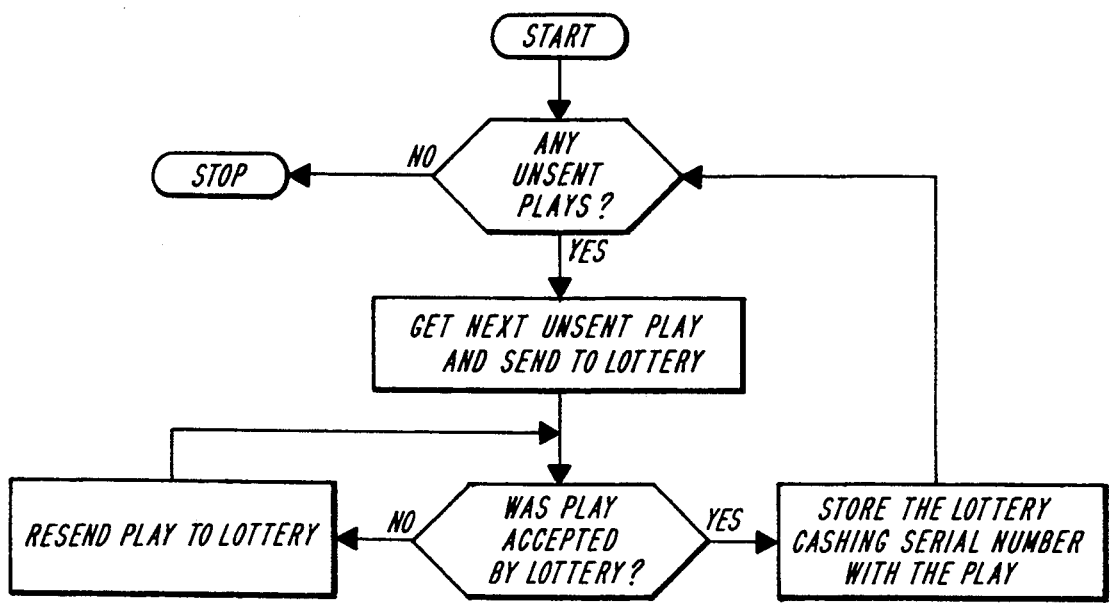

FIG. 2d illustrates the spooling to the lottery computer, of those plays that were stored in the database but were not accepted by the lottery computer. Those plays were called in when the lottery computer was scheduled to be down, typically during the night. When the lottery computer comes back up, typically the next morning, this logic check if there are any unsent plays that need spooling. If an unsent play is found it is sent to the lottery computer and the lottery transaction number returned is stored in the database with the play. This repeats until there are no more unsent plays.

Figure 2E:
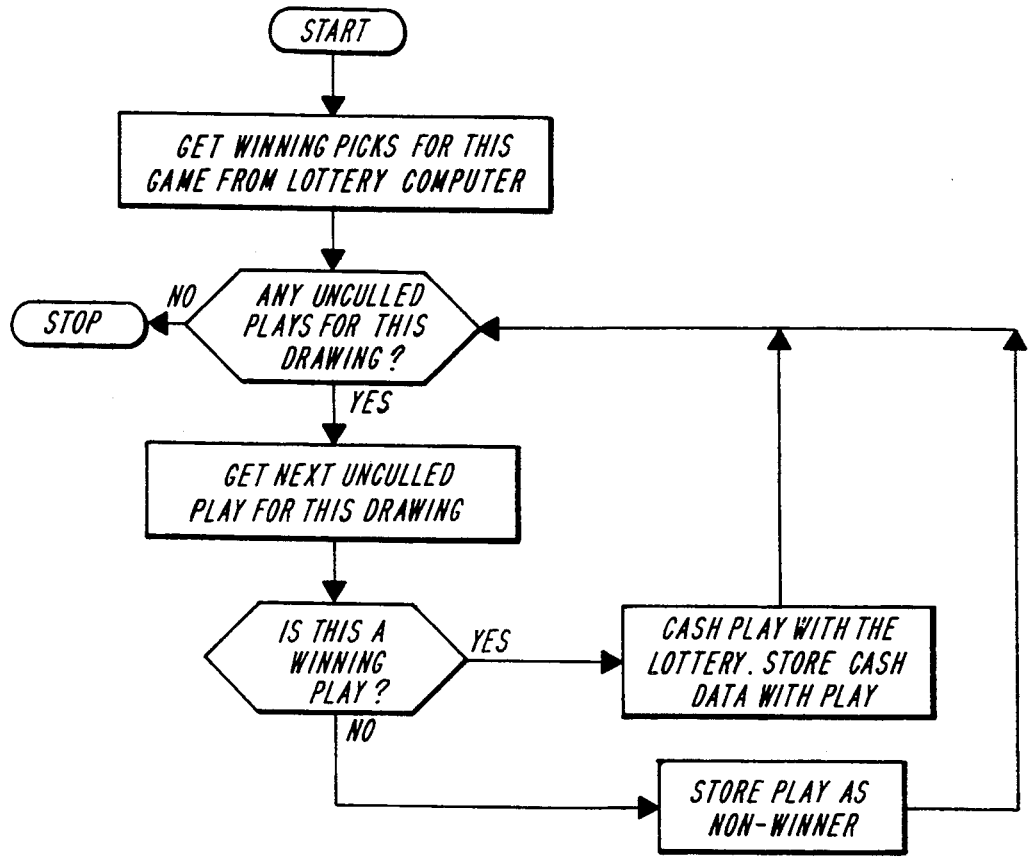

FIG. 2e illustrates the culling of winning plays from all the plays made for a particular game. When the lottery "closes" a game, no more bets may be made to that game, and the lottery holds a drawing to determine the winning picks. This logic block gets the winning picks after a game is closed and when those picks are received, it starts the culling process. The culling involves comparing all plays made for this game that were stored in the database with the winning picks and applying the game specific winning play algorithms. The culling logic checks to see if there are any plays that haven't been culled for this game. If an unculled play is found it is compared to the winning picks. Each winning play is marked and cashed with the lottery computer. Later on those winning plays can then be claimed by a caller using the claiming application. All losing plays are also marked and stored. This repeats until there are no more unsent plays.

Figure 2F:
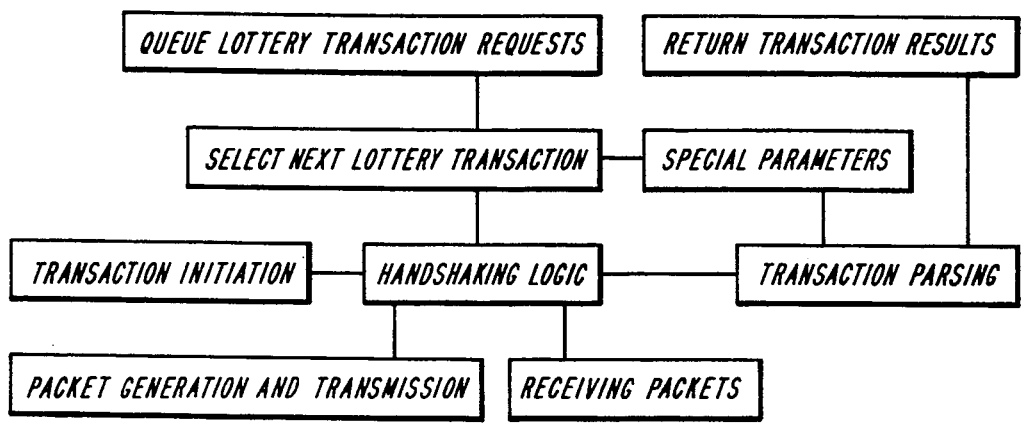

FIG. 2f illustrates the logic blocks of an emulation of a typical lottery protocol. The function of the lottery protocol emulation is to transmit plays and other requests to the lottery computer and receive back play confirmations and other responses. The first logic block takes lottery transaction requests and inserts them into a queue. Some typical queued requests are placing a bet and cashing a winning bet. The next logic block determines which transaction request to initiate next, either a queued transaction request or a static request generated internally by the LPE logic. Static transaction requests are marked by flags which are cleared when the request has successfully completed. Some typical internal static requests are "get lottery parameters", "get last transaction" and "signing on". The algorithm to decide the priority of requests is critical to the operation of this layer and is dependent on the protocol used to communicate with the lottery computer and the possible sequences of transactions that the lottery computer expects. A major example of this is when a bet or cashing transaction is aborted. This sublayer will attach a "get last transaction request" and when the results of that request are received it uses that information to determine if the aborted transaction should be resent to the lottery. This recovery from aborted transactions is described in FIG. 3 in detail. When a transaction request is selected the handshaking logic uses the transaction's initiation logic to start the transaction. This causes the packet generation logic block to transmit the transaction request to the lottery computer according to the protocol specifications. Each transaction type has a packet format for its initial request and response as well as others used in the handshaking logic. Typical handshaking logic packets include acknowledgement, negative acknowledgement (previous packet was received with an error) and idle (no transaction pending on this port). The packets all have a error detecting checksum generated and appended to the packet. The lottery computer normally responds with a result packet which is received by the packet receiving logic block which checks for communication errors in the packet. The handshaking logic controls any retransmission of packets or requesting the lottery computer to retransmit packets according to the protocol specifications. The handshaking logic then uses the parsing logic for the current transaction to parse the result packet which was sent by the lottery in response to a transaction request. These result packets include bet and cash acknowledgements, the winning picks for a game, and lottery parameters. The parsed results are sent to the data processing logic block which typically stores the result data such as the transaction serial number with the play data, and confirms the play to the caller. The final logic block handles the special parameters defined by the protocol which are sent by the lottery and which contain critical status information about the games and the lottery system. The lottery computer can broadcast these parameters whenever any game's status changes or the parameters can be sent upon request from the LPE logic such as when the LBP system starts and initializes itself. The parameters have the drawing dates for the lottery games, and status information on whether each game is "open" (bets are accepted) or "closed" (bets are not accepted).

Figure 3:
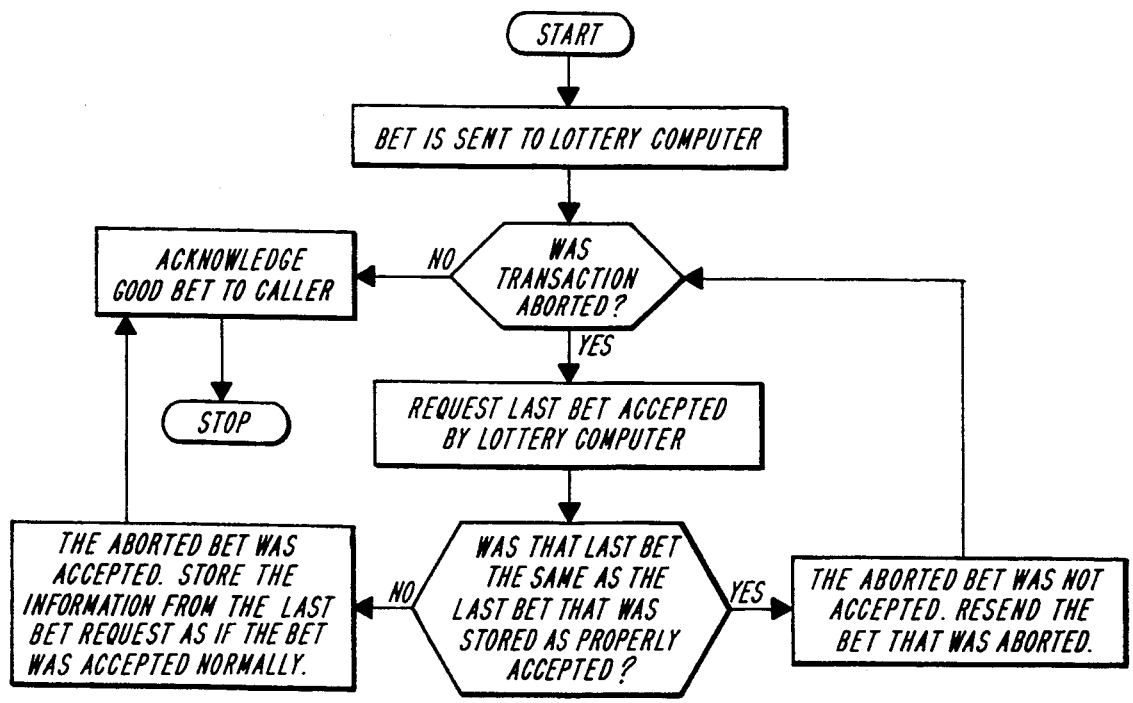
FIG. 3 is a flow chart showing automatic recovery from an aborted transaction by executing the required sequence of transactions.

FIG. 3 illustrates the subset of the protocol logic which handles recovery from transactions which are aborted. Since the abort can occur at any time during the transaction, the LBP system does not know whether the transaction was accepted by the lottery computer system. When a transaction is transmitted to the lottery, a response is eventually sent back that either acknowledges that it was accepted or that the bet was aborted. If the transaction was accepted, the call proceeds normally. If the transaction was aborted, a "get last transaction" transaction is executed and its results are compared to the last transaction that was submitted and accepted. If the data of the last accepted transaction that the lottery recorded is different than the last accepted transaction stored in the LBP system, then the aborted transaction was accepted by the lottery and the call proceeds normally. If the last transaction accepted by the lottery and the last accepted transaction stored in the LBP computer are the same, the aborted transaction never was accepted by the lottery and it is resent.

Figure 4A:
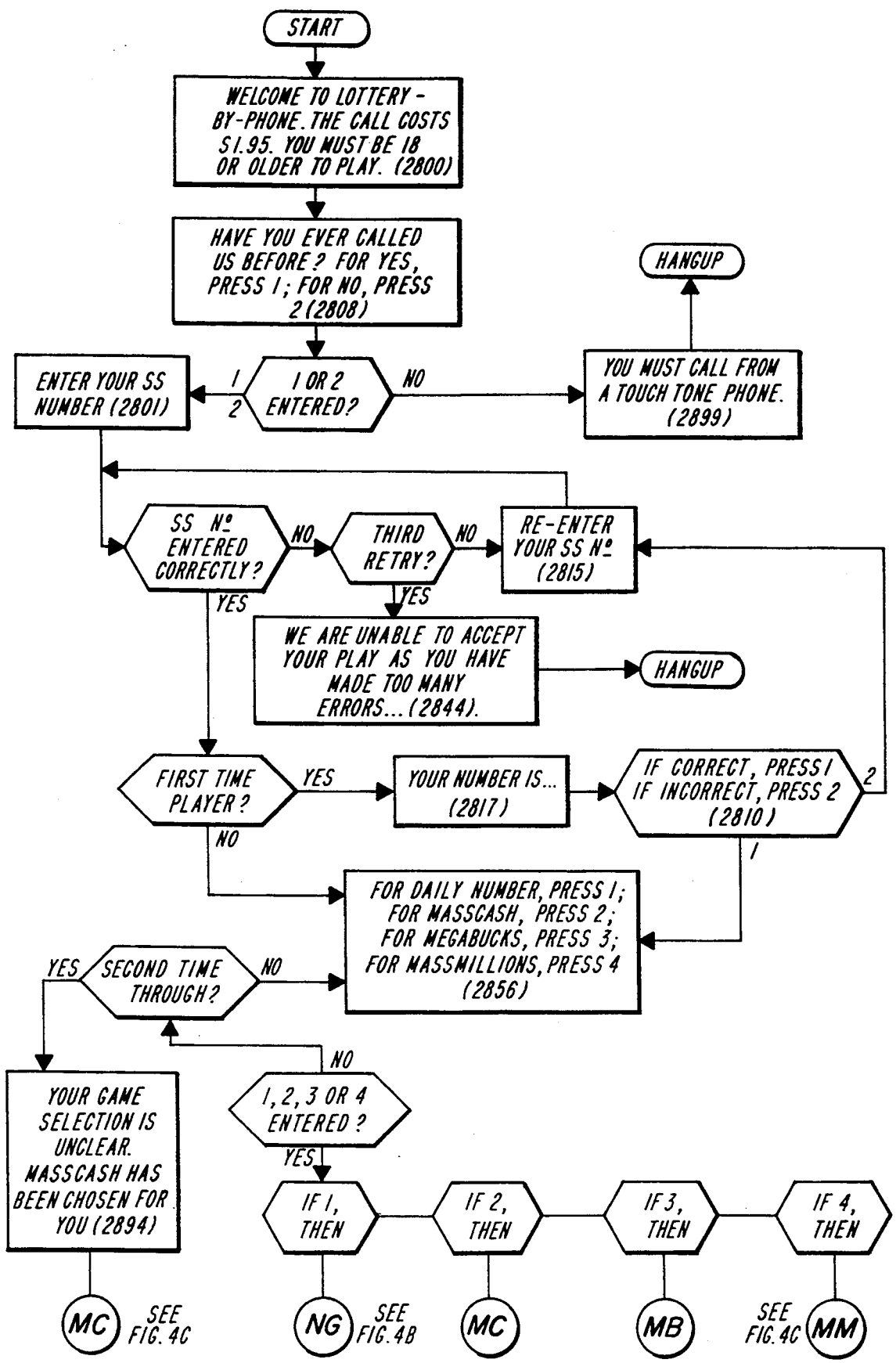
FIG. 4a shows the start of a call to place a bet, the registration of first time callers, entering the identification number, and selection of a game to play by the caller.

FIG. 4a illustrates the start of a call to place a bet with the LBP system. The caller is first asked if they have ever played before. If no touch-tone digit is pressed the call is timed out and the caller is told that they must use a touch-tone telephone and the call is ended. If the caller has properly answered whether they have played before, the caller is then prompted to enter their identification number (typically their social security number). If the caller incorrectly enters the identification number they are given another try, and if that is incorrectly entered they hear an error message and the call is ended. If a caller previously entered that they are a new player, the identification number is repeated back to the caller and they are asked to verify that the entered identification number is correct. If it is incorrect they are given an opportunity to reenter their correct number. After the new caller is finished with registration, or if the caller was previously registered, they are prompted to select the game to play from a menu of the games allowed. In this example there are 4 games—a numbers type game and three different lotto type games. If the game selection is not made correctly after a second try, a default game is selected for the caller. The flow of the call proceeds with FIG. 4b or 4c depending on which game was selected.

Figure 4B:
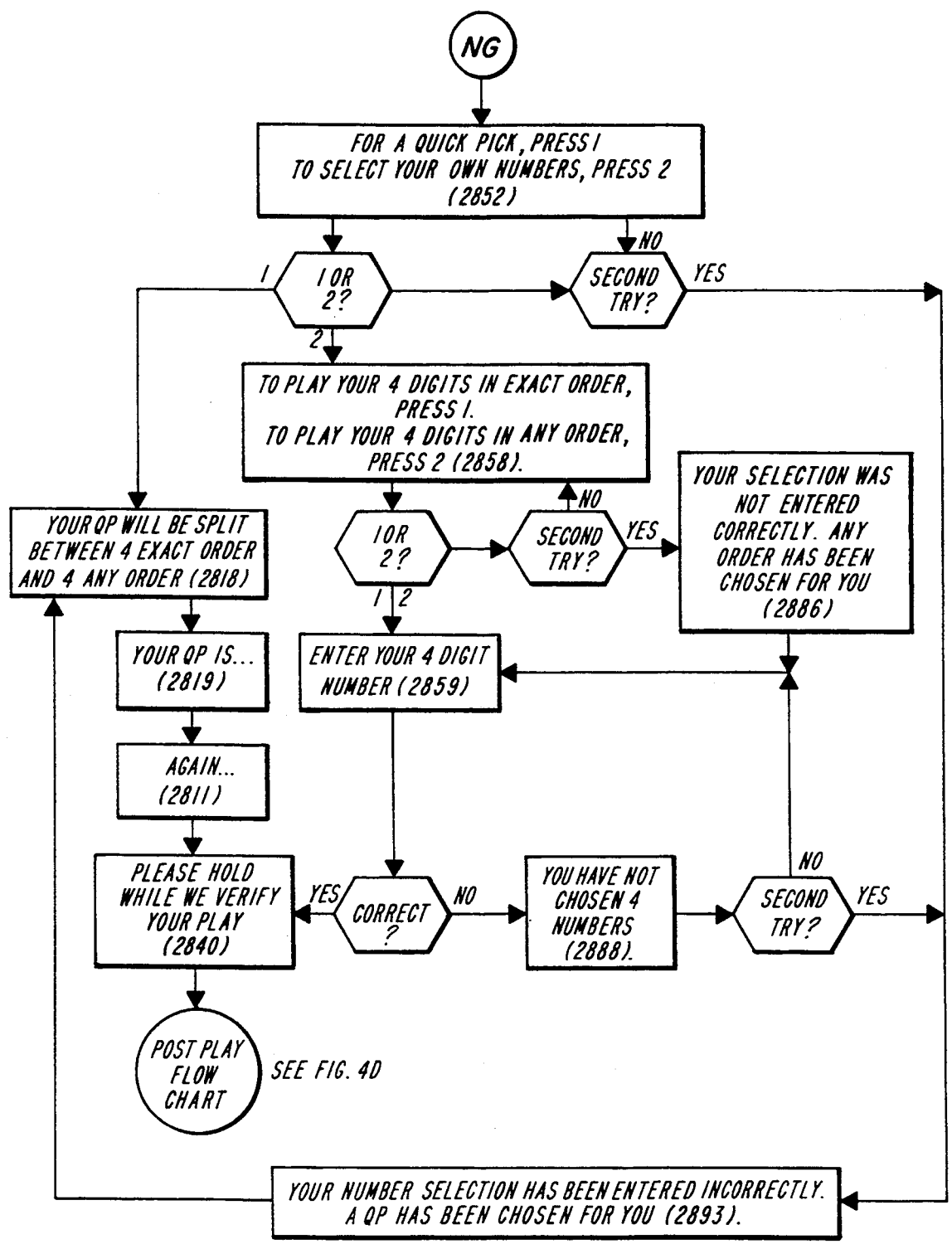
FIG. 4b shows the caller entering data for a numbers type game.

FIG. 4b illustrates the placing of a bet with a four digit numbers type game. The caller is first asked if they wish a quick-pick or wish to select their own numbers. If the answer is not entered correctly after a second try the quick-pick option is selected as a default. If the quick-pick option is selected the caller is told that the bet is split evenly between an exact order bet and an any order bet which matches the behavior of the lottery on-line terminal for numbers game quick-picks. If the caller opted to pick their own numbers, they are asked if they wish the numbers game bet to be in any order or in exact order. If "any" or "exact" order is not entered correctly after two tries, "any" order is selected as a default. The caller is then prompted to enter their four digits. If the numbers are not entered correctly after a second try, the call defaults to the quick-pick option described above. In either case (quick-pick or manual pick) the caller hears the numbers that were picked and a message that they should hold while the bet is confirmed. The flow of the call then proceeds with FIG. 4d.

Figure 4C:
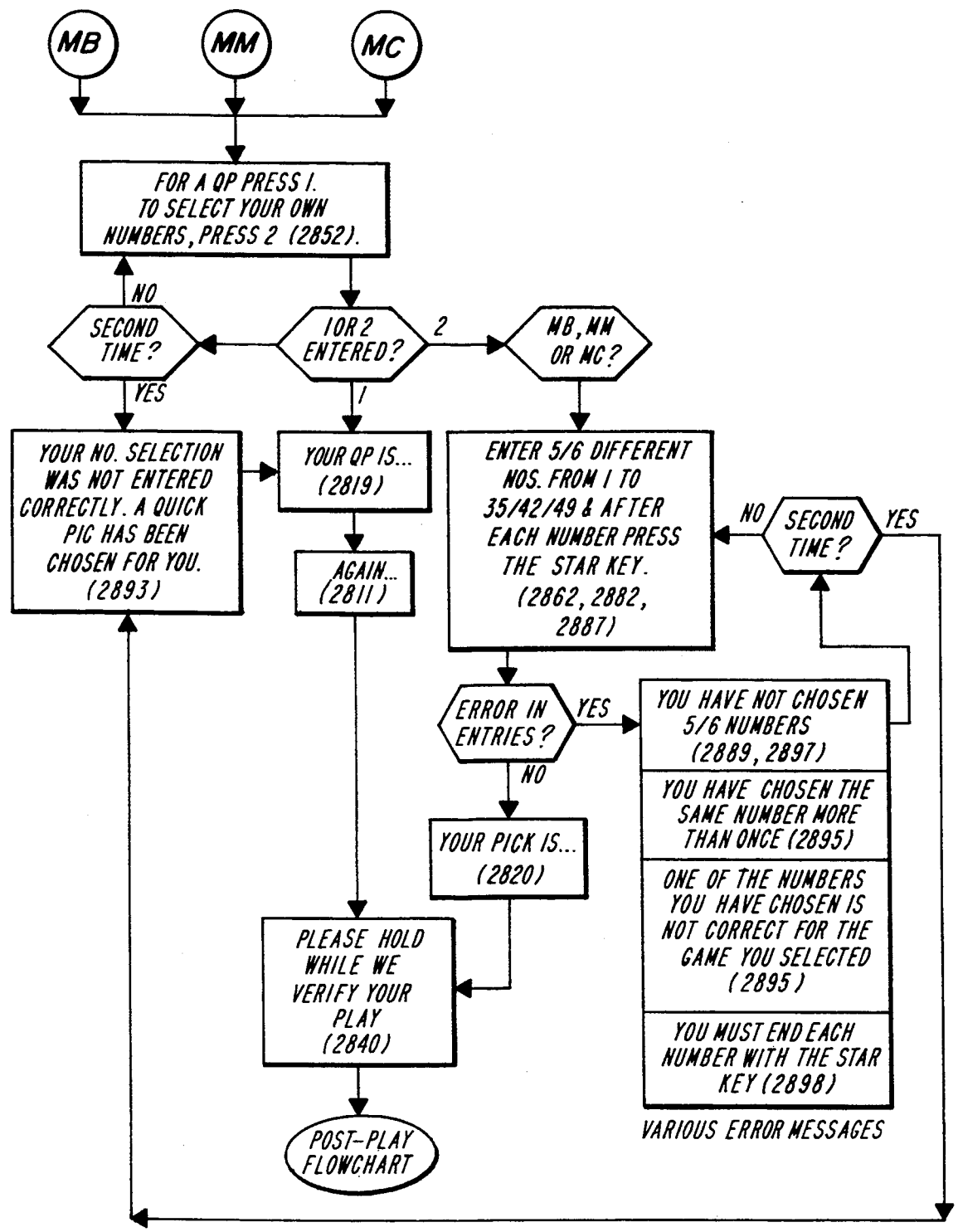
FIG. 4c shows the caller entering data for a lotto type game.

FIG. 4c illustrates the placing of a bet with a lotto type game. All three games are very similar, with the only differences being the size of the unique subset and the range of numbers from which to select the subset. The flow chart shares the logic path with just the subset size and the selection range varying. The caller is first asked whether they wish a quick-pick or they wish to select their own numbers. If the answer is not entered correctly after a second try the quick-pick option is selected as a default. If the caller opted to pick their own numbers, they are asked to enter a unique subset from a range of numbers, ending the entry of each number with the '*' (star) key. The entered numbers are checked for errors such as too few picks, duplicate picks, picks out of range and missing star delimiters. If an error is detected, the caller hears an appropriate message describing what type of error was made (i.e. "you have a duplicated number" or "you have a number that is out of range") and is asked to select their numbers again. If the numbers are not entered correctly after a second try, the call defaults to the quick-pick option described above. In either case (quick-pick or manual pick) the caller hears the numbers that were picked and a message that they should hold while the bet is confirmed. The flow of the call then proceeds with FIG. 4d.

Figure 4D:
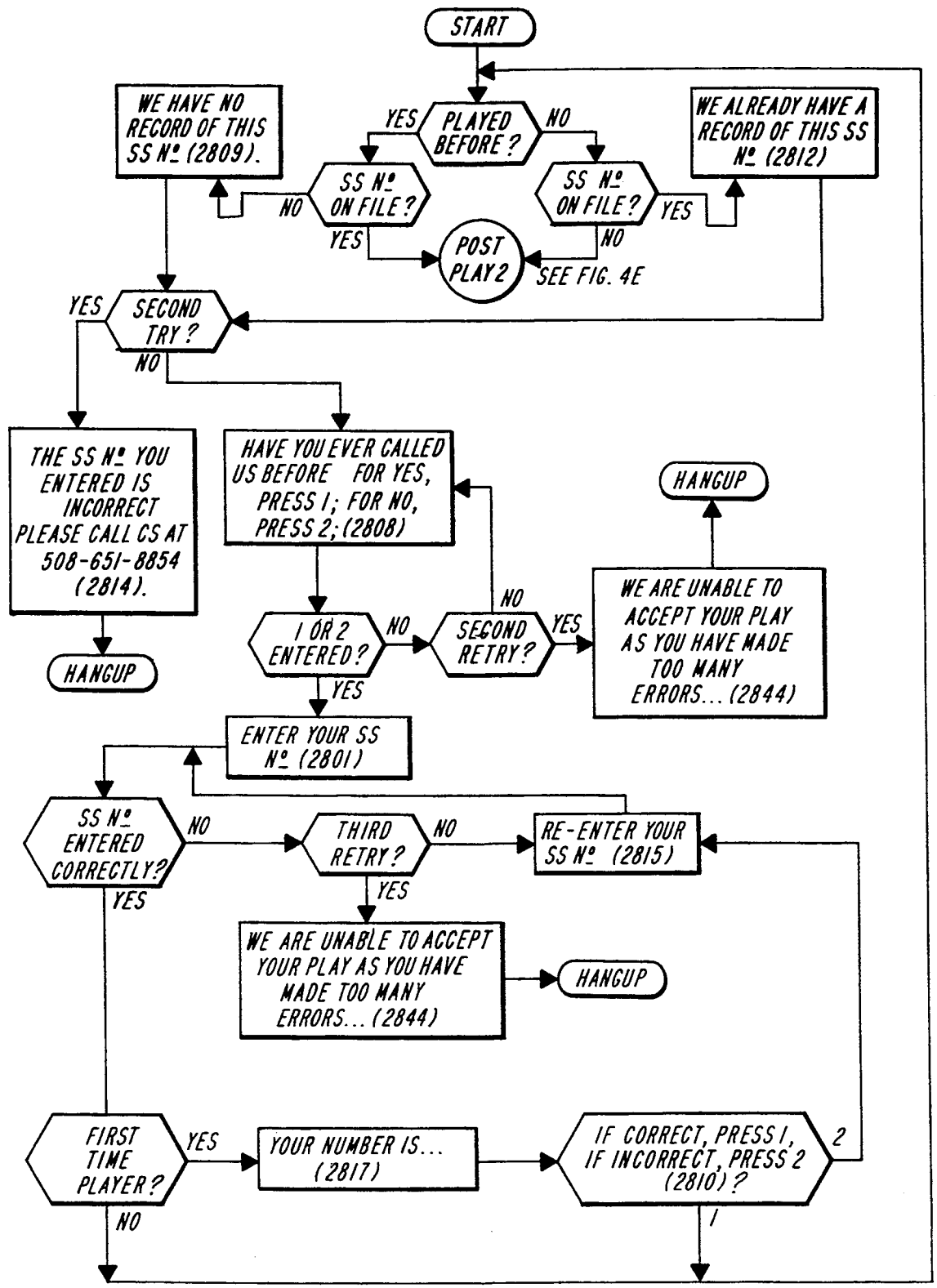
FIG. 4d shows what happens if a caller has not correctly entered their registration status, and the process of the caller entering their correct registration status and registering if necessary.

FIG. 4d illustrates the first phase of post-bet logic flow. First, the caller's answer to the question of whether they have played before is checked for consistency with the database. That is, if the caller entered that they have played before and their identification number is in the database, or if the caller entered that they have not played before and their identification number is not in the database, the call proceeds to the second phase of the post-bet logic flow in FIG. 4e. If the caller's answer was inconsistent with the database because they have played before (or they entered a previously registered identification number), or they have not played before and they entered otherwise, they are then asked again if they have played before. After entering their "having played" status they are again asked for their identification number as in the registration section of FIG. 4a. The first time caller hears the number entered and is allowed to correct it. The check with the database is executed again and if the caller did not answer consistently after this second try the caller is told to contact the customer service group and the call is ended. Otherwise, the call proceeds to the second phase of the post-bet logic flow in FIG. 4e.

Figure 4E:
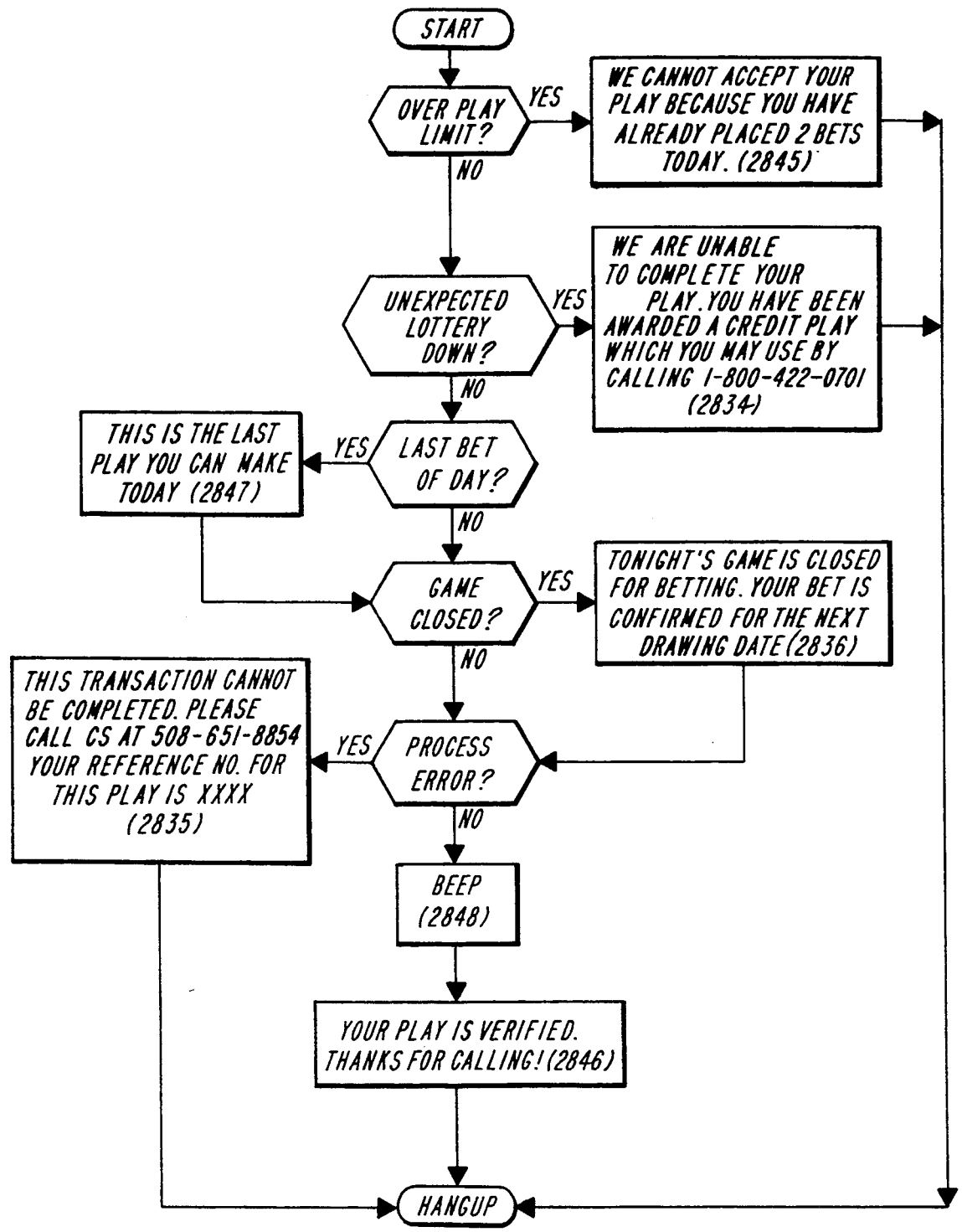
FIG. 4e shows the end of the call to place a bet with special audio messages telling the caller the status of the bet including that they have made too many bets today, the bet will be placed in the next drawing and that the bet is confirmed.

FIG. 4e illustrates the second phase of post-bet logic flow. The database is checked for how many calls have been made today with the entered identification number. If it is over a specified limit, the caller is notified of that fact, the bet is not placed with the lottery computer, and the call is ended. In the event that the play was not accepted to the lottery because of communication failure, the lottery computer was not operating during its normal hours, or other system error, the player is given a play credit to be used at a future time. This credit may be used by the player by calling the same toll-free number as a player with a winning play. If the call is the last call a caller can make today, they are notified of that fact. If the call was placed after a game has closed (allowing no more bets for that drawing) the caller is told that their bet will be entered in the next drawing for that game. If under unusual conditions the bet cannot be placed with the lottery, the caller is notified to call the customer service group and is given a reference number. Finally, all bets placed with the lottery are confirmed to the caller and the call terminates.

Figure 5:
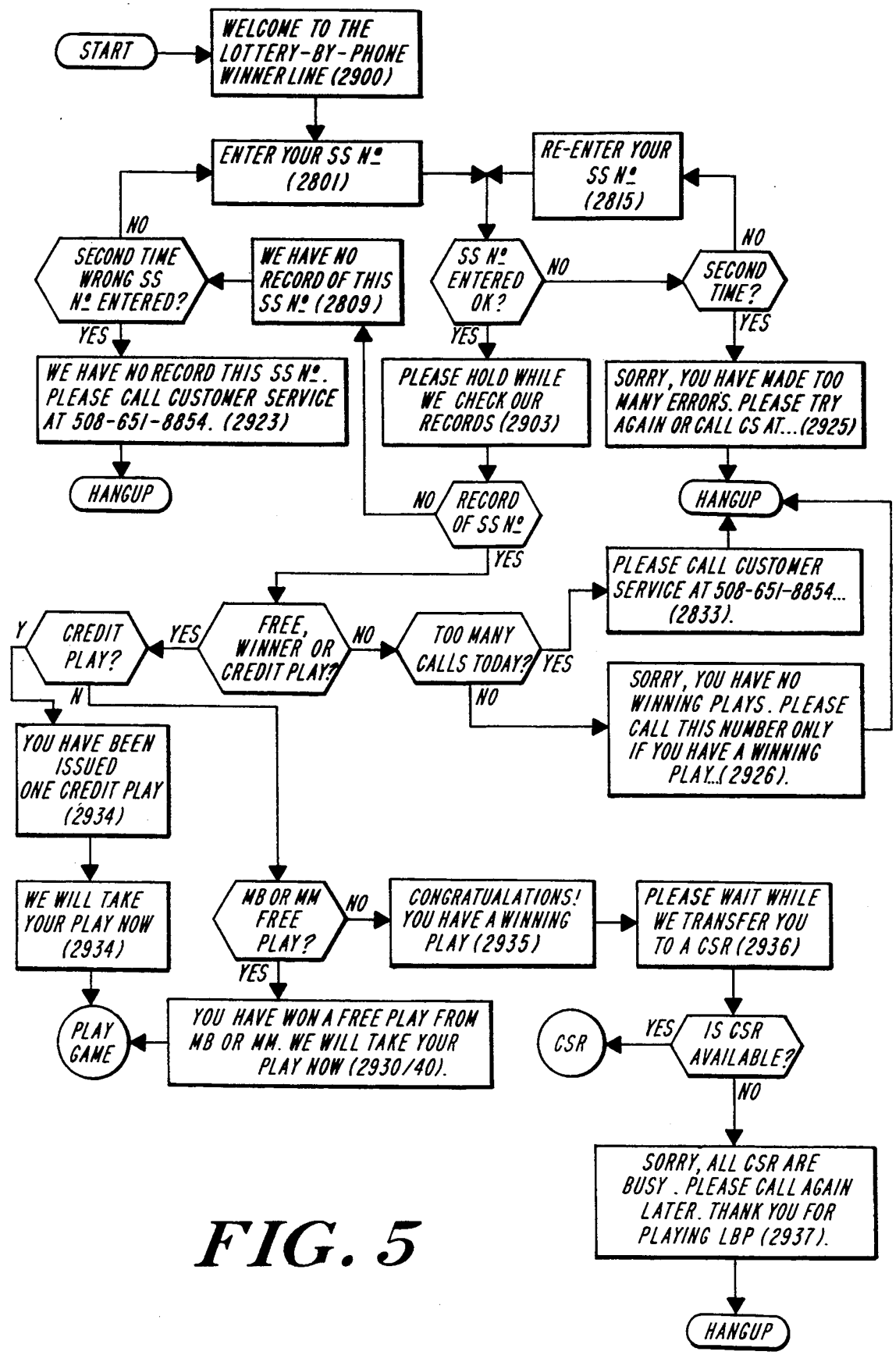
FIG. 5 is a flow chart showing the interaction of the caller and the system while claiming a winning bet.

FIG. 5 illustrates how a caller who has made a winning bet interacts with the LBP system to claim their prize. The caller is instructed to enter the identification number that was entered when the bet was made. If the caller makes a mistake entering the number they have a second chance to enter it, after which a third error will terminate the call. The identification number is looked up in the database and if it was never registered, the caller is allowed a second try to enter the correct number, after which a third time with an unknown number will terminate the call with a message to call the customer service group. The database is then checked for a winning play and if there is none the caller is notified of that fact. If the caller has been thus notified more than a predetermined number of times during the 24 hour period, the call is ended with a message to call the customer service group. The type of winning play is checked next. Callers with cash prizes have their calls switched to customer service operators who will ask for and enter information so the caller can be mailed either the prize in the form of a check, or a claim form for large prizes. If the caller has won a free play from a particular game, they are told to make the free play now, and the caller then makes a bet using the same interaction as described in FIG. 4a–4e. If the caller has a credited free play because of a previous system error, the caller can immediately make a bet with any of the games using the same interaction as described in FIG. 4a–4e.

Figure 6:
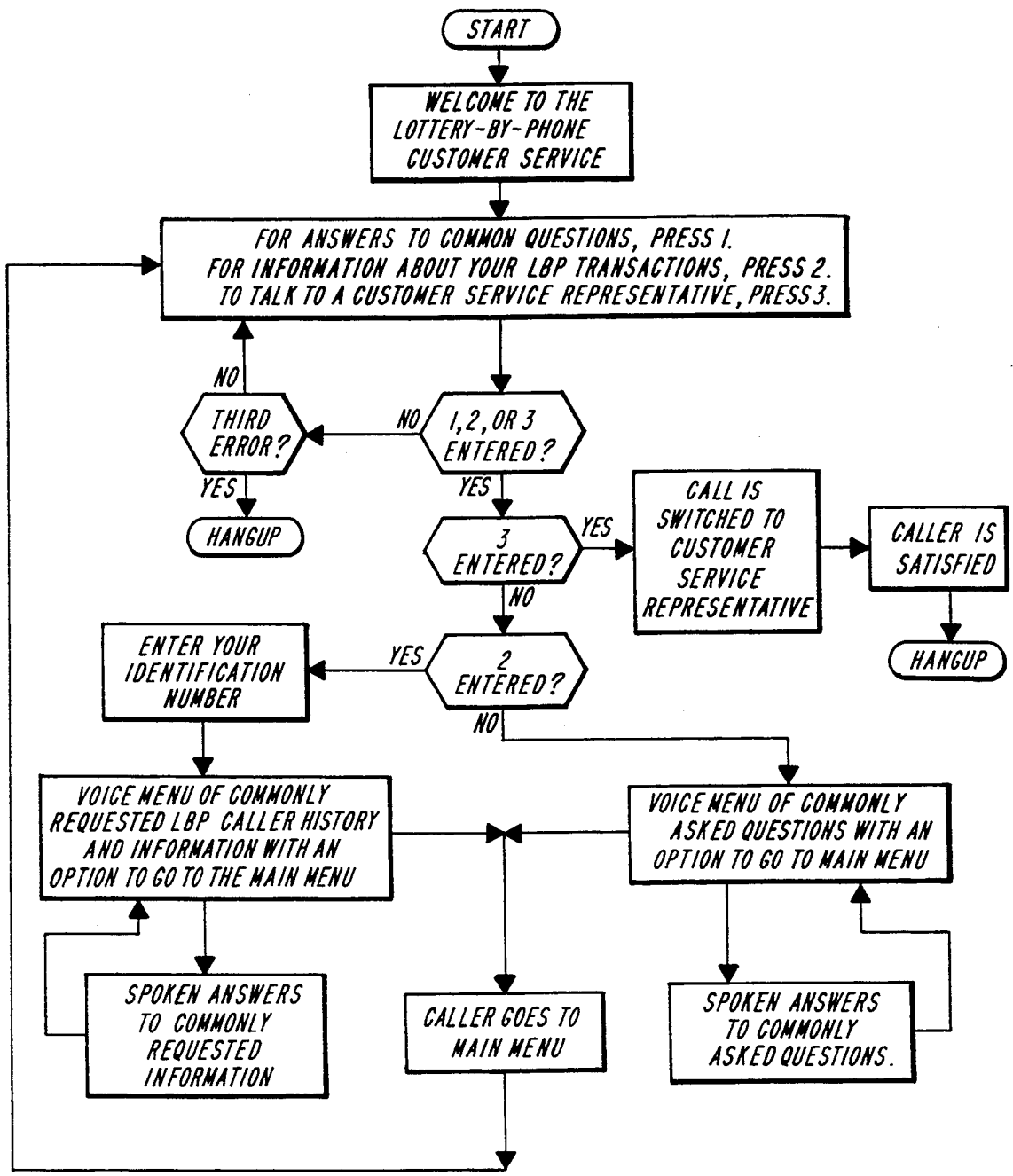
FIG. 6 is a flow chart showing the interaction of the caller and the system when calling the customer service telephone number.

FIG. 6 illustrates how a caller can get help through interaction with the customer service system. A caller calls a different number than the one used to make a bet and hears a greeting message followed by a main menu message. The caller has 3 choices at the main menu: to get answers to commonly asked questions about the LBP system, to get information about the caller's previous plays, claims and other stored information, and to talk directly to a customer service representative. If the caller-entered data is invalid they are prompted with the main menu. After a second entry error the call is ended. If the caller enters that they have a commonly asked question, they then hear a menu of those common questions along with a menu choice to go back to the main menu. If the caller enters the number of a common question they then hear the spoken answer to that question. After the answer is spoken, the common question menu is repeated and the caller can get the answer to another question. If the caller enters that they want information about previous plays, etc., they are prompted to enter their identification number. After entering the ID number, they hear a menu of choices of what information is available along with a menu choice to go back to the main menu. Information is available such as the caller's 5 previous plays, the caller's unclaimed winning plays, status of claimed winning plays, the drawn numbers for lottery games, etc. If the caller enters the number of a menu choice for information they then hear the spoken information. After that is spoken, the information menu is repeated and the caller can get additional information. If the caller entered at the main menu that they want to speak to a customer service representative, they will be switched to the first one available.

The LBP system is a voice response based system that permits persons with Touch-Tone telephones to call a 900 or other number and place bets with a particular state lottery. The caller is billed for the bet on their regular phone bill. All interaction between the caller and LBP is accomplished completely via digitized voice menus and messages output to the caller and touch-tone data input by the caller.

The LBP system consists of a computer system running a collection of networked processes which support a communications link from a caller's touch-tone telephone to the lottery's central computer and which provides many additional features. The communication link and system components and the software processes are briefly described in FIGS. 1 and 2. The following is a detailed description of the components of the LBP system with emphasis on its unique aspects.

The caller initiates a lottery bet placed through the LBP system by dialing the 900 or other telephone number on a standard touch-tone telephone. A standard touch-tone telephone has a keypad which has the digits 0 through 9 and the characters '*' (star) and '#' (hash or pound). Each key, when pressed, generates a dual tone multi-frequency (DTMF) tone which can be decoded by the system to which the telephone is connected. The telephone also has a earphone or speaker with which the caller can hear audio prompts and responses (i.e. speech) generated by the system that decodes the touch-tones.

The caller's telephone is directly wired to a local central exchange of the local telephone company. This local telephone company decodes the dialed 900 or other telephone number and decides where and how to route the call. Depending on the telephone number that was dialed the call may be routed directly to the LBP voice response units or it may go through a long distance carrier which then routes the call to the voice response units.

The call is connected to the LBP system via a single channel in the bank of voice response units (VRU). The VRU's are a standard communications product such as are available from Perception Technology, Canton, Mass. It is a dedicated computer system that allows a touch-tone telephone to be used as a data entry and retrieval device. Each VRU channel has a telephone line interface with a DTMF decoder and an audio output device which can play prerecorded digitized audio messages from its storage devices. It generally has no decision making ability on its own and it acts as a slave to a host computer. The VRU transmits the status of each telephone line, the touch-tone data entered by the callers and other information to the host and it receives commands from the host which can direct it to answer a call, speak a sequence of messages on a channel, switch a call to a local telephone (usually to a customer service representative) or other related operations.

The VRU's host computer is also the central computer system of the LBP system. It is a general purpose computer system with local disk storage, communication ports for the various systems it is connected to, and it runs all the software written exclusively for the LBP system.

The customers service representatives (CSR) who handle caller queries and winning play claims are connected to the LBP computer system by standard computer on-line terminals. They can enter caller information for a claim or request information about the caller's previous plays and prizes, as necessary. The telephones that the CSR's use are connected to the VRU which can switch a caller to a CSR under program control.

The process which communicates with the VRU's is called the voice response server (VRS). It has four major functions: one, it parses responses from and generates commands for the VRU's; two, it communicates with the application interpreter programs; three, it takes the DNIS data sent by the long distance carrier at the start of a call and decides to which application the call should be connected; and four, it maintains the logical connection between an individual call and a logical channel in the appropriate application interpreter process.

The application interpreter (AI) processes do most of the logical interaction with the caller by processing the entered touch-tone data and deciding which audio prompts to speak to the caller. Each AI process interprets its own script, which has been written in a proprietary language, and which describes the interaction with the caller. The language has features to control the logical flow of the call by prompting with menus and branching to different statements based on the entered touch-tone data. It can prompt for and obtain the caller's answers to yes or no questions such as "have you played before?" or "do you want a quick-pick?" Another ability it has is to prompt for a string of digits with or without delimiters ('#' and '*') and only accept a string of the proper length. This is used to get the personal identification number or the picks for a lottery game. This language is designed for ease of use in a voice response environment.

The AI is designed to be a general purpose process which neither makes complex decisions nor communicates with external systems. Another software layer called the control processes (CP) executes these functions. Each control process communicates with its own application interpreter which transmits to the CP the caller-entered data that has been accepted in the proper format. The CP stores the data and when appropriate stores that data in the database or it transmits the data to the lottery computer via the lottery protocol process. One of the control processes which handles claim calls also runs the customer service representative on-line terminals. The control programs execute all the major decisions during a call, such as verifying the personal identification number with the database and possibly requesting the caller to reenter their status of "having played before," telling the caller that the drawing is closed and their bet will be made for the next drawing, telling the caller that they have made too many plays today and the bet will not be accepted, etc.

The spooling control process executes functions that do not require caller interaction. These functions include sending plays that were stored during the night to the lottery, and scanning the database for winning plays after a game has been closed to bettors and a drawing for that game has been made.

The database management system is a commercial software package that permits fast retrieval and updates of stored data records. It is runs as a client process and it is used by both the operators and various processes. It is a standard product such as those offered by Sybase, Inc., Informix, Inc., and others.

A system which permits callers to play a state lottery by telephone but which does not address how callers can collect their winnings or have questions about their plays answered is not practical. Since there is no paper record (i.e. lottery ticket) given to a caller into LBP, there is nothing physical that a caller could bring to a conventional lottery agent to prove that they have won. Thus, callers would be in the position of having won but being unable to collect their winnings. Additionally, if players cannot have questions about their plays answered, they will lose confidence in the system. With no paper record in their possession, callers would react very unfavorably if told that records of their calls/plays into LBP are unavailable.

The customer query system permits LBP callers to call a toll-free 800 or other telephone number and obtain their prizes and obtain answers to questions about the LBP system and to obtain information about their previous LBP plays and wins. The most commonly asked questions and commonly requested information is handled automatically by the claims AI and control process. The caller hears a menu which includes common questions about the LBP system, whether they have a winning play to claim, whether they want information about previous plays or claims and whether they want to be switched to a customer service representative. The caller enters touch-tone data which selects a choice in the menu. If the caller selects a common question they hear the answer and then they hear the menu again. If they request information about previous plays or claims, they are requested to enter their identification number. Then the caller hears other menus which ask what kind of information they desire. The caller can get information such as their previous five plays, winning status and the winning draws for those plays and the status of their claimed wins, i.e. when was their check mailed, etc. If the caller enters that they have a winning play they then are prompted to enter their identification number and follow the logic flow described in FIG. 5. If they won a free play they can make the free play then or if they won a cash prize they will be switched to a customer service representative. Finally the caller, after hearing the menu choices, could choose that they wish to be switched to a customer service representative although the system is designed to reduce this as much as possible so that most customer service calls can be handled completely automatically with no human interaction except by the caller.

A caller may get switched to a customer service representative (CSR) for one of several reasons: they have a complex query, they wish to report a problem or because they have won a cash prize. In all cases the CSR requests the caller's identification number and enters it into a terminal which is running a process that communicates with the database. The CSR then either enters winner data so a check or a claim form can be mailed to the caller or the CSR brings up a screen of data that will help answer the caller query or solve the reported problem.

All bet and winning play claim requests handled by the LBP system must get transmitted to and accepted by the lottery central computer. The lottery protocol emulation (LPE) process handles these tasks as well as managing multiple communication lines to the lottery and communications with other LBP processes. The LPE process communicates with the lottery computer by emulating the communication protocol used by the lottery's on-line terminals and by supporting a subset of the transactions allowed at an on-line terminal. Supporting only a subset of transactions works because many types of on-line terminal functions typically are not needed in the LBP system such as making a so-called "season" bet, running printer diagnostics and canceling a previous bet transaction. The LPE process does support every on-line terminal transaction necessary to keep the LBP system in constant communication with the lottery computer.

The major benefit of emulation of the on-line terminal protocol is that any lottery system can add an LBP system without making any changes in the current lottery computer hardware or software. The LBP hardware and software is "plug-compatible" with existing lottery on-line terminals and transactions made via the LBP system are handled by the lottery computer in the same manner as transactions executed by the lottery's on-line terminals.

The emulation of the lottery on-line terminal has three major parts to it: emulating the ways a player can make bets, emulating how an agent interacts with the on-line terminal, and emulating how the on-line terminal communicates with the lottery computer.

The emulation of a player placing a bet at an on-line terminal is performed by the application interpreter and the control program described in FIG. 2. It allows the player to select a game, and the numbers or picks for the game or a quick-pick. Since the typical caller is not trained to recognize invalid numbers for a particular lottery game, whereas a lottery agent is, the emulation also tells the caller what type of invalid entry occurred if one did occur.

The emulation of the agent's interaction is handled by the protocol process' top level logic. It takes play and cash requests from the control programs and queues them up for transmission to the lottery computer. This logic also handles recovery from exceptional conditions such as aborted transactions. It stops sending bet and cash transactions and retrieves the last accepted transaction from the lottery and if needed, the aborted transaction is resent as described in FIG. 3.

The lower level logic of the protocol process handles the actual communication with the lottery computer including formatting and parsing packets of data, and provides handshaking logic and error detection logic.

The protocol process supports multiple dedicated (leased, not dial-up) telephone lines to the lottery computer and requests are sent on a first-come, first-served basis with all the available bandwidth of these lines being used if needed. LBP telephone lines are not multi-dropped; that is, they are not shared with lottery on-line terminals. This helps provide the high throughput needed to take the data from hundreds or thousands of simultaneous callers into LBP from the direct-dialed long distance network and multiplex them onto a small number of dedicated telephone communications lines, yet appear to give each caller their own connection to the lottery computer in terms of observed responsiveness. This multiplexing capability is necessary and is a major system feature because it would be highly impractical (due to the expense and network complexity) to provide a dedicated telephone connection to the lottery computer for each caller. With the LBP technique, each dedicated telephone line connection from LBP to the lottery computer can handle 100 or more simultaneous callers into LBP, making expansion of the system to handle additional callers easy.

The protocol process takes transaction requests from a control process and queues them up for transmission to the lottery computer. If a dedicated line is available the bet is sent at the next poll on that line, or else it waits in a queue for a free line. When a line to the lottery opens up, the LPE process checks the queue of pending transactions and if there are any, it dequeues the first one and logically attaches to the communication line. When a communication line is polled and there is a transaction ready for transmission, it is translated to the packet format required by the lottery computer and sent over the line. The lottery response is then read, parsed, translated back into the LBP format and sent to the process that requested the bet originally. All lottery computer transactions generate a response with a lottery transaction identification number which is stored in the LBP database management system.

Part of the emulation includes a method of handling LBP calls when the lottery computer is scheduled to be down such as during the night. Instead of not accepting the plays (which is exactly what would be happen with an on-line terminal if a bet were to be placed while the lottery computer was down), the LPE process responds that the bet was accepted by it but not by the lottery computer and the bet is stored in the database for later transmission to the lottery. The call proceeds normally as if the lottery did accept the bet. When the lottery computer resumes normal operation, the spooling control process will send these stored bets to the LPE process which then sends them to the lottery computer. This is a major LBP advantage compared to the restrictions of playing at an on-line lottery agent because it means that a lottery bet can be made conveniently from a telephone whenever the player wants to make the bet and not be restricted to the normal hours of operation of an on-line lottery agent.

The lottery protocol defines various error checking and error recovery procedures at several levels. The protocol process will resend or request resending of packets that were received with errors. If too many retransmissions occur during a transaction, the transaction is aborted. The LBP protocol process automatically checks if the request was accepted by the lottery computer by requesting the last request that the lottery computer received on the serial line and comparing it to the request it is trying to send. It will try to resend the request if necessary. A pure emulation of the on-line terminal protocol would not handle this common problem. The protocol would give up immediately and the caller would have to be informed that their play did not get through. Since most communications errors on these dedicated lines are the result of noise bursts, incorporating this automatic retry mechanism into the LBP protocol reduces the number of "failed bet attempts" and makes it more practical.

Since the caller is always charged for a call to the 900 telephone number used by LBP (regardless of whether the caller successfully made a play), a credit mechanism is designed into the LBP system to handle those rare instances where a play was not accepted by the lottery computer. The caller is notified of the condition and their account in the database is credited with a free play that can be played on the toll-free 800 number or other number, so that the caller does not lose any money because of the system error.

Another key feature of the error handling involves "bad" dedicated lines. If a dedicated line gets too many data errors or simply stops communicating any information, it is automatically removed from the "active" list of dedicated lines and is effectively removed from service. Information that would normally be sent on that defective line will be sent on a working line instead. If a line that has been removed from service starts working normally, it will automatically be added back to the active list and will be used for sending data. This feature permits the repair of defective telephone lines and their reintroduction to normal communications handling to occur with little or no disruption to the normal flow of LBP information to/from a state lottery.

The standard lottery on-line terminal works only when the lottery is polling the terminals connected to it. Lottery computers generally poll on-line terminals during normal working hours and part of the evening and generally do not poll 24 hours a day. The LBP protocol process knows the schedule in regard to when the lottery computer is down and will not try to send a play to the lottery when it is down. Instead, it will send a response back to the requesting process that the lottery is down according to its schedule. The requesting process will store the play in the database management system as not having been sent to the lottery, but it will tell the caller that the play was accepted the same as a play that is made when the lottery computer is polling. The caller hears no difference. When the lottery computer starts polling again, the stored but unsent plays are sent in a single batch to the lottery according to the normal protocol and the database management system is updated with the lottery transaction identification numbers for these plays.

Each call made by a caller to the LBP's 900 or other number will result in a predetermined charge on the caller's telephone bill. For a given 900 charge a predetermined portion is used to purchase a bet with the lottery. Since different games have different minimum bet units the LBP system will purchase per call the number of bet units required to add up to the amount allocated per call to purchase bets with the lottery. For example if each call has $1.00 allocated to purchase bets, a $0.25 minimum bet game will have 4 bet units purchased per call and a $1.00 minimum bet game will have 1 bet unit purchased per call. This total charge to the caller includes fees charged by the local and long distance telephone company, the fee charged by the LBP system as well as the purchase price of the bet with the lottery.

Variations of the preferred embodiment of the system will occur to those skilled in the art, and to the extent they fall within the spirit and scope of the invention, as defined by the claims, they are considered to be subject to this patent. For example, the telephone of a bettor may send signals generated some other way than by "touch tone." The response unit may return a message that is not a voice message but is instead a visual message if the bettor's telephone is equipped to receive and display such a message. And, of course, while the embodiment refers to a state lottery and a state lottery computer, a lottery operated by any other entity could be the subject of the invention.

What is claimed:

1. A system for playing a lottery by signals from a telephone, for use with a lottery computer that ordinarily accepts digital input in proper form from staffed remote terminals as bet transactions, that records bet transactions that have been completed, and that provides digital output confirming that a bet transaction has been completed, the system including:
    response means for interacting with a telephone bettor, coupled to said lottery computer, including:
        instruction means for giving pre-selected messages in response to first selected telephone signals,
        input means for transferring data to said lottery computer as a bet transaction in response to second selected telephone signals,
        confirmation means for confirming to a telephone bettor that a bet transaction has been completed by said lottery computer,
        said confirmation means including error detection and correction means for deleting and correcting aborted bet transactions while a telephone bettor is on the line.

2. The system of claim 1 wherein said error detection and correction means includes:
    detection means for detecting when output confirming completion of a bet transaction has been received from said lottery computer, and correction means for resending a bet transaction that was not confirmed as accepted by said lottery computer.

3. The system of claim 2 wherein said detection means includes last-bet-means for determining the last bet accepted by said lottery computer,
said correction means includes comparison means for comparing said last bet accepted by said lottery computer to the last bet for which confirmation of completion was detected, and resend means for resending said last bet transaction that was not confirmed as accepted, if said comparison is positive, and not resending said last bet transaction if said comparison is negative.

4. The system of claim 3 wherein said error detection and correction means includes acknowledgment means for acknowledging said bet transaction if said comparison is negative.

5. The system of claim 1 including
data storage means for receiving bet transaction data from said response input means, coupled to said response means and said lottery computer,
said data storage means including:
data input storage means for storing bet transaction data transmitted from said response input means,
data output means for transmitting bet transaction data to said lottery computer,
availability detection means for detecting when said lottery computer is unavailable to accept bet transaction data, and
spooling means for storing bet transaction data when said lottery computer is unavailable.

6. The system of claim 5 wherein said availability detection means includes means for detecting when said lottery computer is available to accept bet transaction data, and said spooling means includes means for transmitting bet transaction data that was stored when said lottery computer was unavailable.

7. The system of claim 1 in which said lottery computer further includes means for storing and transmitting winning bet data including
data storage means for receiving winning bet data form said lottery computer, coupled to said response means and said lottery computer,
said data storage means including
data input storage means for storing bet transaction data transmitted from said response means,
winning bet input means for storing winning bet data transmitted by said lottery computer,
culling means for comparing winning bet data stored in said data storage means to bet transaction data stored in said data storage means, and
winning bet marking means for marking all winning bet transactions in said data input storage means.

8. The system of claim 7 wherein said response means instruction means includes authorization means for authorizing free bets to bettors in response to third selected telephone signals.

9. A system for playing a lottery by signals from a telephone, for use with a lottery computer that ordinarily accepts digital input in proper form from staffed remote terminals as bet transactions, that records bet transaction that have been completed, and that provides digital output confirming that a bet transaction has been completed, the system including:

(a) response means for interacting with a telephone bettor, coupled to said lottery computer, including:
instruction means for giving pre-selected messages, responsive to first selected telephone signals,
input means for transmitting data as a bet transaction in response to second selected telephone signals, and
confirmation means for confirming to a telephone bettor that a bet transaction has been completed by said lottery computer, and
(b) data storage means for receiving bet transaction data from said response input means, coupled to said response means and said lottery computer, said data storage means including:
data input storage means for storing bet transaction data transmitted by said response means input means,
data output means for transmitting bet transaction data to said lottery computer.
availability detection means for detecting when said lottery computer is unavailable to accept bet transaction data, and
spooling means for storing bet transaction data when said lottery computer is unavailable.

10. The system of claim 9 wherein said availability detection means includes means for detecting when said lottery computer is available to accept bet transaction data, and said spooling means includes means for transmitting bet transaction data that was stored when said lottery computer was unavailable.

11. A system for playing a lottery by signals from a telephone, for use with a lottery computer that ordinarily accepts digital input in proper form from staffed remote terminals as bet transactions, that records bet transactions that have been completed, that provides digital input confirming that a bet transaction has been completed, and that stores and transmits winning bet data, the system including:

(a) voice response means for interacting with a telephone bettor, coupled to said lottery computer, including
instruction means for giving pre-selected aural messages, responsive to first selected telephone signals,
input means for transmitting data as a bet transaction in response to second selected telephone signals, and
confirmation means for confirming to a telephone bettor that a bet transaction has been completed by said lottery computer, and
(b) data storage means for receiving winning bet data from said lottery computer, coupled to said response means and said lottery computer, said data storage means including:
data input storage means for storing bet transaction data transmitted by said response means input means,
winning bet input means for storing winning bet data transmitted by said lottery computer,
culling means for comparing winning bet data stored in said data storage means to bet transaction data stored in said data storage means, and
winning bet marking means for marking winning bet transactions in said data input storage means.

12. The system of claim 11 wherein said response means instruction means includes authorization means for authorizing free bets to bettors in response to third selected telephone signals.

* * * * *